United States Patent

Hayashi et al.

[11] Patent Number: 5,929,417
[45] Date of Patent: Jul. 27, 1999

[54] IMAGE READING APPARATUS WITH DATA DENSITY AND GAMMA CORRECTION MEANS

[75] Inventors: Shuji Hayashi; Koji Nakamura, both of Osaka, Japan

[73] Assignee: Mita Industrial Co., Ltd., Osaka-fu, Japan

[21] Appl. No.: 08/865,093

[22] Filed: May 29, 1997

[30] Foreign Application Priority Data

Jun. 11, 1996 [JP] Japan ................................. 8-149096

[51] Int. Cl.⁶ ............................. G06K 7/10; H04N 5/202; H04N 5/20; H04N 5/64
[52] U.S. Cl. ..................... 235/454; 235/455; 235/467; 235/472; 348/254; 348/255; 348/256
[58] Field of Search ............................. 235/454, 455, 235/467, 472; 348/254, 255, 256, 674, 675, 676, 677; 358/164

[56] References Cited

U.S. PATENT DOCUMENTS

| | | | |
|---|---|---|---|
| 4,903,121 | 2/1990 | Uomori | 358/41 |
| 5,361,140 | 11/1994 | Hayenga et al. | 348/255 |
| 5,404,165 | 4/1995 | Ohtsubo et al. | 348/254 |
| 5,532,467 | 7/1996 | Roustaei | 235/472 |
| 5,717,200 | 2/1998 | Hashimoto | 235/454 |

Primary Examiner—Anita Pellman Gross
Assistant Examiner—Daniel St. Cyr
Attorney, Agent, or Firm—Jordan and Hamburg

[57] ABSTRACT

An image reading apparatus in which reference density data corresponding to a reference document having a predetermined reference density is stored in advance, while a plurality of gamma correction curves are also stored in advance. Light intensity data indicative of the intensity of light reflected from the reference document is subjected to a shading correction. One gamma correction curve is selected from the plurality of gamma correction curves in correspondence to a difference in output level between the reference density data and outputted density data obtained by converting the shading corrected light intensity data. Gradation of the outputted density data is adjusted based on the selected gamma correction curve.

8 Claims, 9 Drawing Sheets

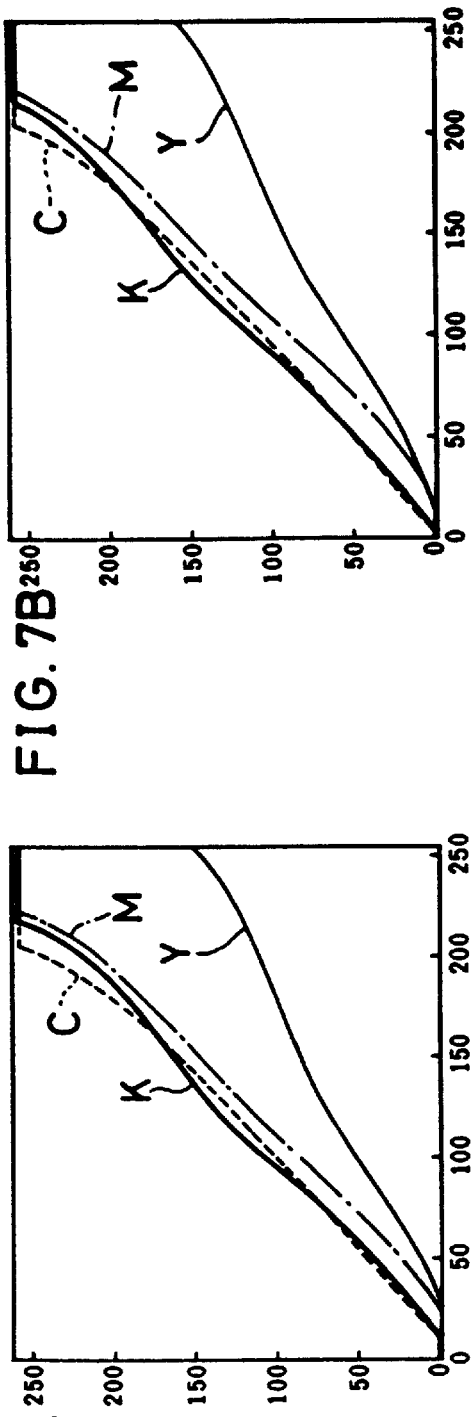

IMAGE READING APPARATUS WITH DATA DENSITY AND GAMMA CORRECTION MEANS

BACKGROUND OF THE INVENTION

This invention relates to an image reading apparatus for use in a digital copying machine, facsimile machine or its equivalents.

Generally, an image reading apparatus such as an image scanner has been known in which a multitude of photoelectric conversion elements such as CCDs are arranged in a highly dense manner to read an image of an original document. In such image reading apparatus, light reflected from the original image is guided to the photoelectric conversion elements via an optical system to obtain data concerning the intensity of received light (hereinafter merely referred to as "light intensity data").

To obtain accurate light intensity data on the original image, a reference plate of white color having a standard brightness (hereinafter merely referred to as a "shading correction plate" or "reference plate") is employed to compensate shading resulting from irregularities of illuminated light and variations of sensitivity to light of the photoelectric conversion elements.

Specifically, the image reading apparatus reads the intensity of light reflected from the shading correction plate to obtain reference data on the shading correction plate, and then the light intensity data on the original image is corrected on the basis of the thus obtained reference data on the shading correction plate. This correction is called "shading correction".

The above conventional image reading apparatus has suffered from the following drawback. If the shading correction plate or the optical system has been smeared with dusts, dirt, and the like, accurate light intensity data on the shading correction plate, or data for shading correction cannot be obtained, and accordingly, a precise shading correction is not executable. To solve such problem, an image reading apparatus has been proposed which has the capability of judging whether the cause for producing inaccurate data is due to smearing of the shading correction plate or of the optical system (Japanese Unexamined Patent Publication No. HEI 6-78147).

However, the image reading apparatus proposed in the above patent publication cannot perform an accurate image reading unless the cause for occurrence of inaccurate data for shading correction is removed, i.e., unless the optical system and/or the shading correction plate has to be cleaned, even though a service person is informed of the judgment result that the cause is due to smearing of the optical system or of the shading correction plate. That is, regardless of the content of the judgment result, the optical system and/or the shading correction plate must be cleaned to perform an accurate image reading, which is cumbersome for a service person and impairs workability of the image reading apparatus.

SUMMARY OF THE INVENTION

It is therefore an object of the invention to overcome the aforementioned drawback in the conventional technology.

It is another object of the invention to provide an image reading apparatus which has the capability of reading an image of an original document with a reliable reproducibility, without frequent cleaning of an optical system and a shading correction plate, irrespective of the content of a judgment result as to whether a cause for deterioration of image reading performance is due to smearing of the shading correction plate or of the optical system.

To realize the above objects, an image reading apparatus of the present invention comprises: an optical system for guiding light reflected from a shading correction plate and from an original document image to a specified position; light receiving means including a number of photoelectric conversion elements for receiving the light reflected from the shading correction plate and the light reflected from the original image via the optical system to output light intensity data; shading correction means for performing a shading correction to the light intensity data of the original image based on the light intensity data of the shading correction plate to output shading corrected data; density conversion means for converting the shading corrected data into density data; reference density data storage means for storing reference density data on a reference document having a predetermined reference density therein; gamma correction curve storage means for storing a plurality of gamma correction curves therein; correction curve selection means for selecting one gamma correction curve from the plurality of gamma correction curves in correspondence to a difference in output level between the reference density data and current density data obtained by performing a shading correction to light intensity data of the reference document based on the light intensity data of the shading correction plate and by converting the shading corrected light intensity data of the reference document into density data; and gradation adjusting means for adjusting a gradation of the density data outputted from the density conversion means based on the selected gamma correction curve.

With this arrangement, even if the level of output data outputted from the photoelectric conversion elements with respect to the reference document is changed, an adverse effect owing to the change can be eliminated. Thereby, deterioration of image quality can be prevented even if the optical system and/or shading correction means should be smeared.

The above and other objects, features and advantages of the present invention will become more apparent upon a reading of the following detailed description and drawings.

BRIEF DESCRIPTION OF THE DRAWINGS

FIGS. 6A to 6D, 7A to 7D, and 8A to 8B are graphs showing various gamma correction curve sets each of which has an output signal level different from the reference gamma correction curve set in FIG. 3.

DETAILED DESCRIPTION OF THE PREFERRED EMBODIMENTS OF THE INVENTION

Figure 1:
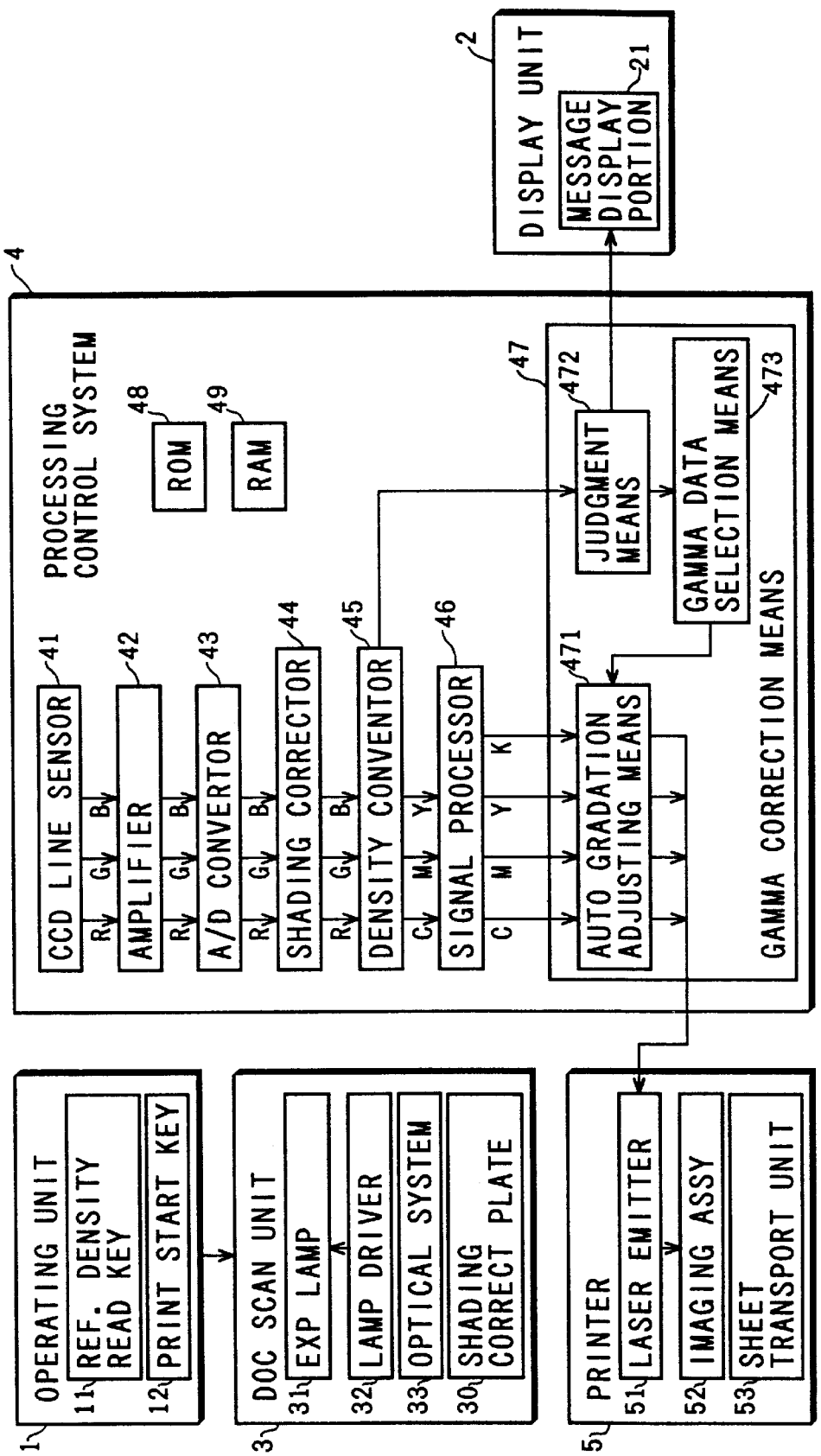
FIG. 1 is a block diagram showing an arrangement of an embodiment of a digital copying machine according to this invention.
Figure 2:
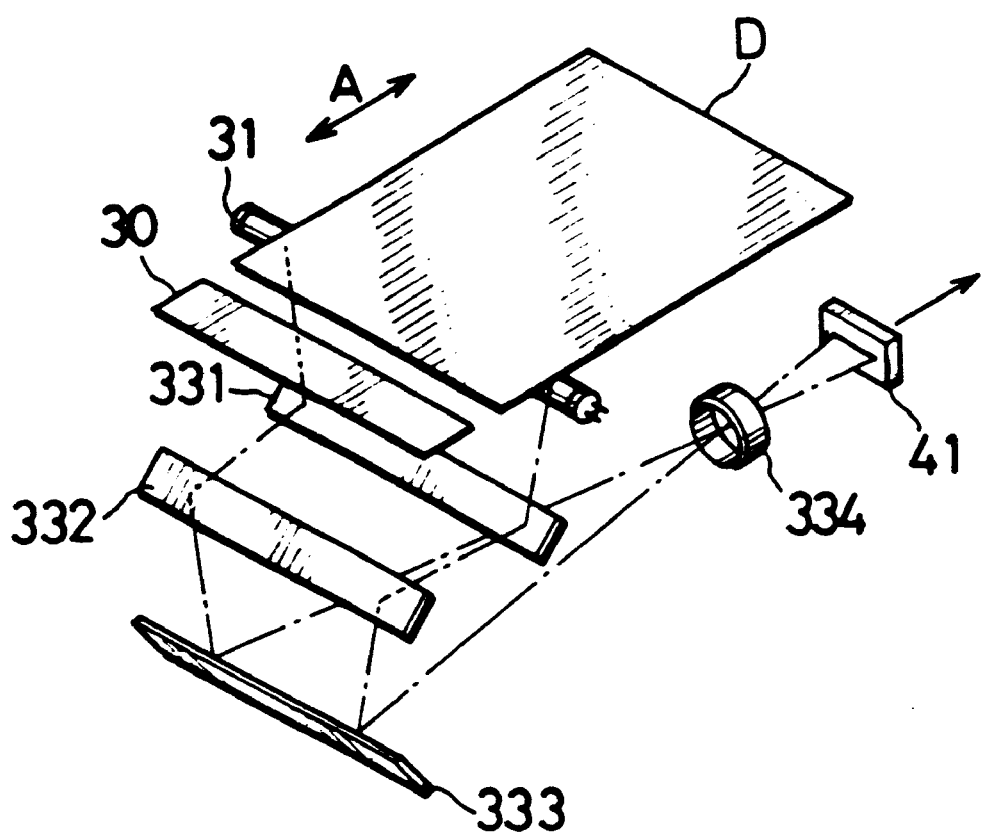
FIG. 2 is a schematic diagram of a document scan unit of the copying machine.
Figure 3:
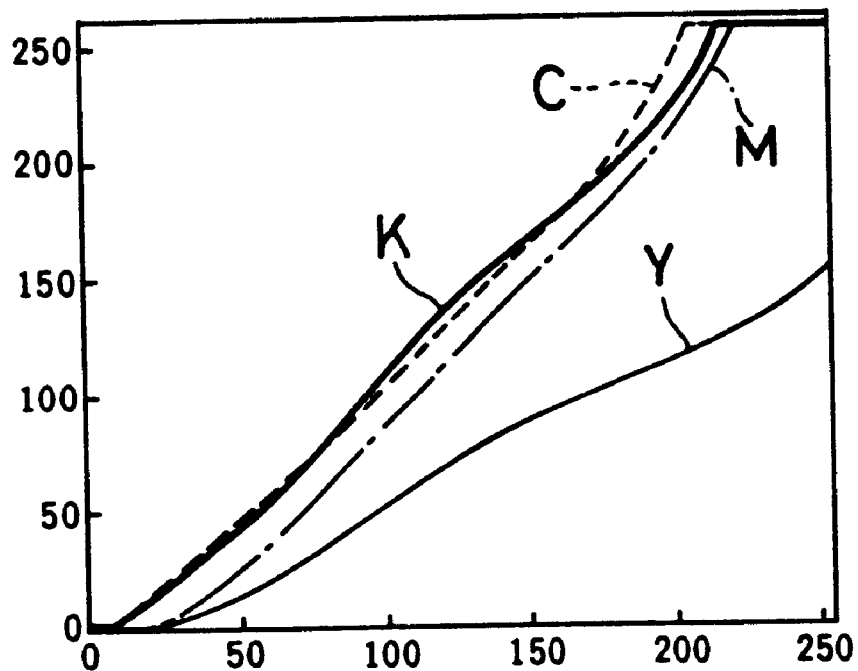
FIG. 3 is a graph showing a set of reference gamma correction curves stored in a ROM.

FIG. 1 is a block diagram showing an arrangement of a digital copying machine embodying this invention, FIG. 2 is a schematic diagram of a document scan unit of the digital copying machine, and FIG. 3 is a graph showing a set of reference gamma correction curves stored in a ROM 48 of th e digital copying machine.

The digital copying machine comprises an operating unit 1, display unit 2, document scan unit 3, processing control system 4, and printer 5. The operating unit 1 is arranged at an appropriate position on a surface of a main body of the copying machine, and is provided with a reference density read key 11, a print start key 12 for initiating a copying operation, and other unillustrated operation keys such as copy number set key for setting the number of copies to be obtained from each document, and magnification rate set key for setting a magnification rate for copying.

The display unit 2 is arranged at an appropriate position on the surface of the machine main body, e.g., near the operating unit 1, and includes a LCD panel. The display unit 2 has a message display portion 21 and is adapted for displaying necessary information on copying such as the number of copies set by the copy number set key and the magnification rate set by the magnification rate set key.

The document scan unit 3 includes a shading correction plate 30, an exposure lamp 31, a lamp driver 32, an optical system 33, and an unillustrated contact glass for placing a document D thereon (see FIG. 2).

The shading correction plate 30 is a plate of standard white color used in performing a shading correction. As shown in FIG. 2, the shading correction plate 30 is arranged close to the document D to be placed on the contact glass. The exposure lamp 31 is a fluorescent lamp or a halogen lamp or its equivalent, and is adapted for illuminating the shading correction plate 30 and the document D. The lamp driver 32 allows the exposure lamp 31 to emit light, while moving the same in the arrow directions in FIG. 2 so as to illuminate the document D over its entire plane.

The optical system 33 includes, as shown in FIG. 2, reflective mirrors 331 to 333 and a focus lens 334, and is adapted for guiding the light of the original image reflected from the document D toward a CCD line sensor 41 and focusing the light image on a surface of the line sensor 41. The CCD line sensor 41 is described later.

The processing control system 4 comprises the CCD line sensor 41, amplifier 42, analog-to-digital converting means (or A/D convertor) 43, shading correction means 44, density conversion means 45, signal processing means 46, gamma correction means 47, ROM 48 and RAM 49. The ROM 48 stores therein predetermined data such as the reference gamma correction curve set shown in FIG. 3, and data on reference output curves in the form of an input/output look-up table. The reference output curves will be described later. The RAM 49 temporarily stores various data therein.

The CCD line sensor 41 is constructed such that a multitude of photoelectric conversion elements (CCDs) are arrayed in a line. At a front surface of the CCD line sensor 41, there are disposed color filters of three primary colors, red (R), green (G), and blue (B) with a certain color pattern. The line sensor 41 outputs a signal (voltage signal) indicative of a voltage level for each color, R, G, and B in proportion to a light amount incident upon the surface of the color filters. The amplifier 42 amplifies (the level of??) the thus obtained output signal for each color, R, G, and B. The A/D convertor 43 converts the analog voltage signal amplified by the amplifier 42 into a digital signal (8 bit data in this embodiment).

The shading correction means 44 corrects a voltage signal obtained on the basis of light intensity reflected from the document D, using a voltage signal obtained on the basis of light intensity reflected from the shading correction plate 30. Thus, variations of sensitivity to light of the CCDs and irregularities of illuminated light of the exposure lamp 31 are offset (i.e., shading is compensated).

The density conversion means 45 converts data on luminosity of the primary colors R, G, and B (luminance data) into data on density of reference colors, cyan (C), magenta (M), and yellow (Y). The signal processing means 46 executes various color processings based on the thus obtained density data on the colors C, M, and Y, such as converting density data on the colors C, M, and Y into monochromatic data on black (K) and the like.

The gamma correction means 47 performs a gamma correction to adjust contrast and tone of the reference colors, and includes an automatic gradation adjusting means 471, judgment means 472, and gamma correction data selection means 473.

The printer 5 comprises a laser emitter 51, an imaging assembly 52, and a sheet transport device 53, and is adapted for outputting image data subjected to the specified processings in the processing control system 4 in the form of texts and pictures on a sheet of recording paper. The laser emitter 51 includes a light source (not shown) of emitting a laser beam and a polygon mirror (not shown), and is operated such that a beam of laser light emitted from the light source is modulated in accordance with density data on the colors C, M, Y, and K outputted from the gamma correction means 47, and the modulated beam of light is guided to the imaging assembly 52 via the polygon mirror.

The imaging assembly 52 comprises a main charger, photosensitive member, developing device, transfer device, and fixing device (not shown). The sheet transport device 53 is adapted for transporting recording paper accommodated in a sheet storage portion to the imaging assembly 52. The above modulated beam of laser light is projected to a charged surface of the photosensitive member, thereby forming an electrostatic latent image thereon, and the thus formed latent image is developed into a toner image by the developing device while attracting color toner of the colors of C, M, and Y thereto. Thereafter, the transfer device transfers the toner image to a sheet of recording paper which is transported to the imaging assembly 52 as timed with formation of the electrostatic latent image, in a state that the colors are superimposed one after another. Subsequently, the recording paper carrying the thus transferred color toner image is fixed thereon by the fixing device.

Next, the automatic gradation adjusting means 471 is described in details with reference to FIGS. 4A, 4B, 4C, 4D.

FIGS. 4A, 4B, 4C, 4D are diagrams explaining procedures as to how a gamma correction curve used in automatic gradation adjustment conducted by the automatic gradation adjusting means 471 is produced. FIGS. 4A,4B,4C,4D. In described is as to how density data on the color of cyan (C) outputted from the signal processing means 46 is processed. It is to be noted that procedures of producing a gamma correction curve for density data on other colors such as M, Y, and K are similar to the one described herein.

Figure 4A:
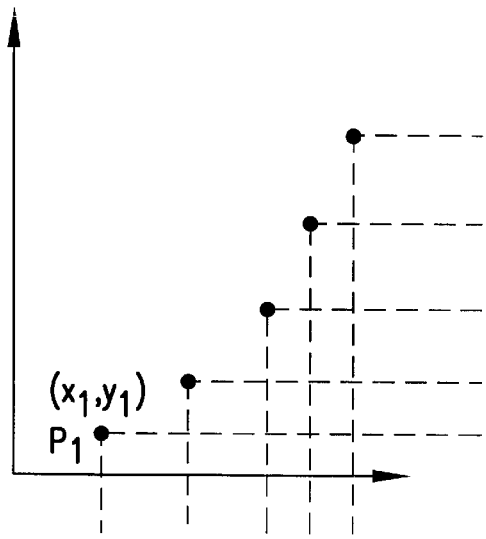
FIGS. 4A 4B, 4C, 4D are diagrams explaining procedures as to how a gamma correction curve for automatic gradation adjustment conducted by automatic gradation adjusting means is obtained.

FIG 4A is a graph indicating sampling points indicative of density data on the color C, which is outputted from the signal processing means 46 by reading the image of the original document D and sampled out at an arbitrary interval. It should be appreciated that the origin point (0, 0) and the terminal point (255, $Y_{MAX}$), are set as essential points in advance.

Figure 4B:
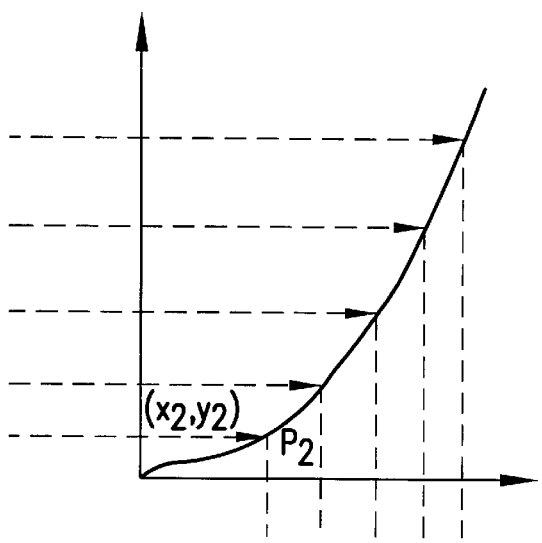

FIG. 4B shows a reference output curve produced by plotting out the points indicative of the density data on the color C which are outputted from the signal processing means 46 when the image of the original document D whose density ranges from 0% to 100% is read with an increment of 10% according to, e.g., standard 65L of Test Chart No. 4 of Denshi Shashin Gakkai. This reference output curve is stored in the ROM 48.

Figure 4C:
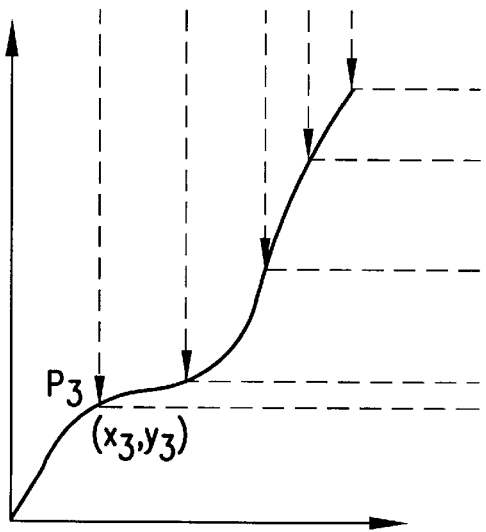

FIG. 4C shows the reference gamma correction curve for density data on the color C of the reference gamma correction curve set shown in FIG. 3. The reference gamma correction curve set is also stored in advance in the ROM 48.

Figure 4D:
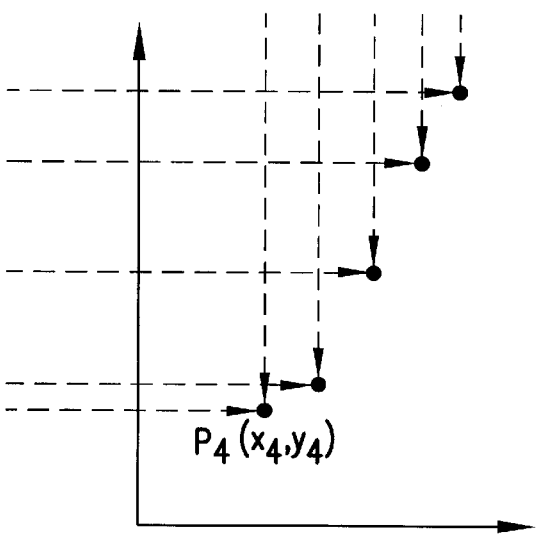

FIG. 4D is a graph showing resultant points corresponding to the sampling points in FIG. 4A obtained by the following steps. By plotting out these resultant points, there is obtained a gamma correction curve used in automatic gradation adjustment. Specifically, assuming. that there is a point P1 whose X-, Y-coordinate values are (x1, y1) in FIG. 4A Then, this point P1 is converted to a corresponding point P2 (x2, y2) in FIG. 4B by horizontally extending a line from the point P1 along the X-axis to intersect the reference output curve in FIG. 4B. At the same time, the point P1 in FIG. 4A is converted to a corresponding point P3 (x3, y3) in FIG. 4C by vertically extending a line from the point P1 along the Y-axis till it makes an intersection with a gamma correction curve in FIG. 4C. At a final stage, a point P4 (x4, y4) in FIG. 4D is obtained by an intersecting point made by a horizontally extended line from the point P3 and the vertically extended line from the point P2. The gamma correction curve in FIG. 4C. is the reference gamma correction curve for density data on the color C shown in FIG. 3. It is to be noted that the reference gamma correction curves for density data on the other colors, M, Y, and K are obtained in a similar fashion by executing the above steps and that the reference gamma correction curves for the colors C, M, Y, and K are stored in advance, as the set of reference gamma correction curves in the ROM 48.

In this way, the sampling points for the density data on the color C are sequentially converted to corresponding points in FIG. 4D. By plotting out these resultant points in FIG. D, there is produced the gamma correction curve for the density data on the color C for automatic gradation adjustment.

Thus, density data on the color C outputted from the signal processing means 46 are outputted to the printer 5 after being subjected to an appropriate gamma correction by the automatic gradation adjusting means 471 with the use of the gamma correction curve for automatic gradation adjustment obtained by executing the above conversion steps shown in FIG. 4, as output data representative of the color C. In this way, there is assuredly obtained optimum density data of the color C.

Next, the principle of this invention is described with reference to FIGS. 5A to 5C.

Figure 5A:
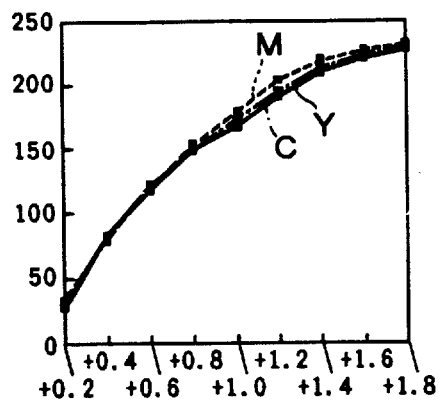
FIGS. 5A to 5C are graphs showing output level (gradation level) on density data of colors, cyan (C), magenta (M), and yellow (Y) respectively outputted from density conversion means in relation to the brightness ranging from +0.2 to +1.8, when a reference document of gray color is read by the copying machine.
Figure 5B:
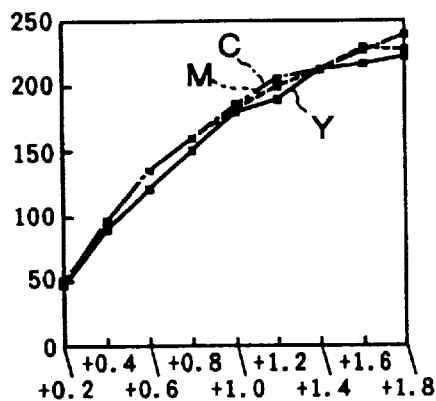
Figure 5C:
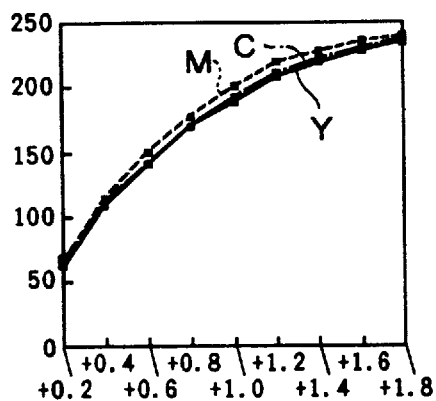

FIGS. 5A to 5C are graphs showing density data of each color, C, M, and Y outputted from the density conversion means 45 (see FIG. 1) when reference documents of gray color (or simply referred to as a "gray sample") of a certain brightness ranging from +0.2 to +1.8 are read by the digital copying machine of this invention. Specifically, the graphs in these figures show a relationship between density data of each color indicated by gradation level (output level) and brightness of the gray samples.

More specifically, FIG. 5A is a graph showing density data of each color in the case where a smeared shading correction plate P1 is used as the shading correction plate (reference plate), FIG. 5B is a graph showing density data of each color in the case where a shading correction plate P2 of standard white color (of standard brightness) is used, and FIG. 5C is a graph showing density data of each color in the case where a shading correction plate P3 having brightness greater than the shading correction plate P2 (i.e., of greater brightness) is used as the reference plate.

In case where the smeared shading correction plate P1 is used as the reference plate, as shown in FIGS. 5A and 5B, level of outputted data of each of the colors, C, M, and Y as a whole is lowered than those obtained by using the shading correction plate P2 of standard brightness. This is because of the following reason. When a shading correction is performed using the smeared shading correction plate P1, a reference value on white color sensed by the CCD line sensor 41 is biased toward black side. Thereby, even though the same gray sample having the same density level is used as the reference document, a difference in output level between the read density level and the biased reference level becomes smaller, compared to the case where the shading correction plate P2 of standard white color is used.

What happens when the smeared reference plate is used and the reference value on white color is biased toward black side is as follows. The level of voltage signal outputted from the signal processing means 46 becomes generally low er than the output level shown in FIG.4A. Accordingly, the gamma correction curve for automatic gradation adjustment shown in FIG. 4D is raised, compared to the case where the reference plate of standard brightness is used. Thereby, after executing a gradation adjustment by the automatic gradation adjusting means 471, outputted is the density data whose gradation level is set higher than the actual density data.

On the contrary, in case where the shading correction plate P3 of greater brightness is used, as shown in FIGS. 5B and 5C, output level of density data obtained by using the shading correction plate P3 is raised as a whole, compared to the case where the shading correction plate P2 of standard brightness is used. This is because of the following reason. When a shading correction is performed using the shading correction plate P3 of greater brightness, a reference value on white color sensed by the CCD line sensor 41 is away from the black side, i.e., biased toward the white side. Thereby, even though the same gray sample having the same density level is used as the reference document, a difference in output level between the read density level and the biased reference level becomes larger, compared to the case where the shading correction plate P2 of standard brightness is used.

Accordingly, the level of voltage signal outputted from the signal processing means 46 becomes higher than the output level shown in FIG. 4A, and the gamma correction curve for automatic gradation adjustment shown in FIG. 4D is lowered, compared to the case where the reference plate of standard brightness is used. Thereby, after executing a gradation adjustment by the automatic gradation adjusting means 471, outputted is the density data whose gradation level is set lower than the actual gradation level.

To eliminate the above mentioned erroneous output of density data, a shading correction plate of standard white color is used as the reference plate, and the reference document having a predetermined reference density (gray sample) is read using this reference plate. At this time, density data on the colors, C, M, and Y outputted from the density conversion means 45 (see FIG. 1) after being subjected to the respective specified processings in the CCD line sensor 41, amplifier 42, A/D convertor 43, and shading correction means 44, is stored in advance in the ROM 48 as reference density data. Further, the ROM 48 stores in advance various gamma correction curve sets in such a manner that each gamma correction curve set has an output level different from the reference gamma correction curve set shown in FIG. 3.

With this arrangement, even in the case where an image formation cannot be executed with a desirable density level, due to e.g., increase of measurement error in reading operation of the image reading apparatus during use of the digital copying machine, the copying machine can return to a proper image formation by performing the following steps. Specifically, the reference document of the reference density is read to render the density conversion means 45 (see FIG. 1) output density data on the colors of C, M, and Y on the reference document. The output data is compared with the reference density data stored in the ROM 48. Then, one gamma correction curve set is selected from the plurality of gamma correction curve sets stored in the ROM 48 for automatic gradation adjustment, in accordance with a difference in output level between the obtained density data and the stored reference density data. The automatic gradation adjustment for image reading operation thereafter is conducted based on the selected gamma correction curve set. Thereby, the copying machine can be returned to an initial state where output of optimum density data is enabled.

Next, described is how the above described principle is adaptable to the digital copying machine of this invention with reference to FIGS. 1, and 6A to 8B. FIGS. 6A to 8B are graphs showing various gamma correction curve sets each of which has an output level different from the reference gamma correction curve set shown in FIG. 3.

As a reference density, there may be adopted various measurement standards, such as gray N6.5 according to Munsell Color System, in which the gradation level of the colors, C, M, and Y is set such that (C, M, Y)=(85, 85, 85) when the density data is represented on the basis of 8 bit data (gradation level ranging from 0 to 255); black +0.4 of Test Chart No. 5-1 of Denshi Shashin Gakkai, wherein (C, M, Y)=(95, 95, 95); and other gray color whose gradation level belongs to a medium region of the gradation levels ranging from 0 to 255.

Further, when a photographic document is used as the reference document, reading performance can be enhanced, compared to the case where an ordinary document whose image is composed of dots is used as the reference document.

As mentioned above, the ROM 48 stores in advance the various gamma correction curve sets shown in FIGS. 6A to 8B, and also stores, in advance, density data on the colors, C, M, and Y outputted from the density conversion means 45 which are obtained by reading the reference document with the use of the reference plate (shading correction plate of standard white color) having standard brightness (i.e., in the initial state), as the reference density data.

The judgment means 472 is adapted for comparing the density data on the colors, C, M, and Y which are outputted from the density conversion means 45 when the reference density read key 11 of the operating unit 1 is operated to read the reference density of the reference document, with the reference density data stored in the ROM 48 so as to produce a difference in output level (gradation level) between the outputted density data and the stored reference density data on each of the colors C, M, and Y. Then, an average value of the thus obtained difference in output level on the colors C, M, and Y is calculated, and the calculated average value is set as a difference in output level (denoted by $\Delta D$) on the colors C, M, and Y.

Alternatively, the judgment means 472 may be operated such that an average value of the maximum value and the minimum value of the difference in output level for the colors C, M, and Y is calculated and the calculated average value is set as the difference in output level. Further, the judgment means 472 may set the value other than the maximum value and the minimum value of the difference in output level for the colors of C, M, and Y as the middle value which is to be outputted as the difference in output level.

If the difference in output level (gradation level) outputted from the judgment means 472 is less than $-25$ (i.e., $\Delta D < -25$, where $\Delta D$ denotes the difference in gradation level), it is presumed that a poor image formation is due to smearing of the shading correction plate 30, exposure lamp 31 and/or optical system 33. Accordingly, a message informing that cleaning of these elements is necessary is displayed on the message display portion 21 of the display unit 2.

On the contrary, when the difference in gradation level outputted from the judgment means 472 exceeds $+25$ (i.e., $\Delta D > +25$), it is assumed that a poor image formation is due to smearing of the contact glass of the document scan unit 3 and/or light emission anomaly of the exposure lamp 31. Accordingly, a message informing that cleaning of the contact glass and adjustment of light emission amount of the exposure lamp 31 are necessary is displayed on the message display portion 21 of the display unit 2.

The gamma correction data selection means 473 selects one gamma correction curve set from the various gamma correction curve sets stored in the ROM 48 (shown in FIGS. 6A to 8B) to raise the output data, when the difference $\Delta D$ obtained by the calculation by the judgment means 472 lies in the negative region, whereas selects one gamma correction curve set to lower the output data when the obtained difference $\Delta D$ lies in the positive region.

Figure 6A:
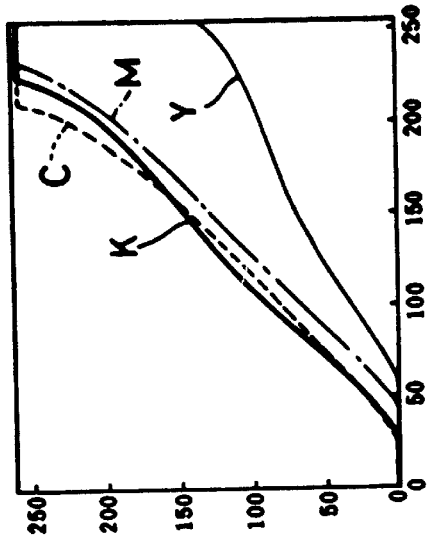
Figure 6B:
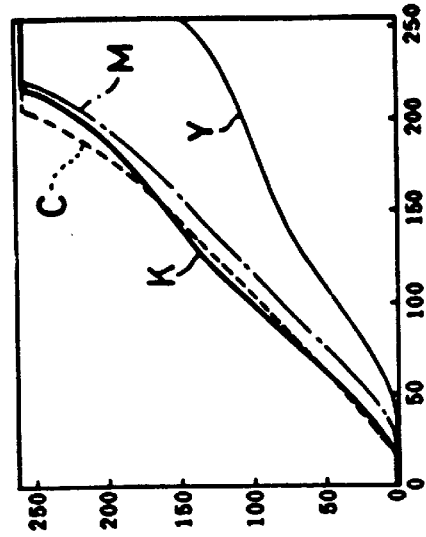
Figure 6C:
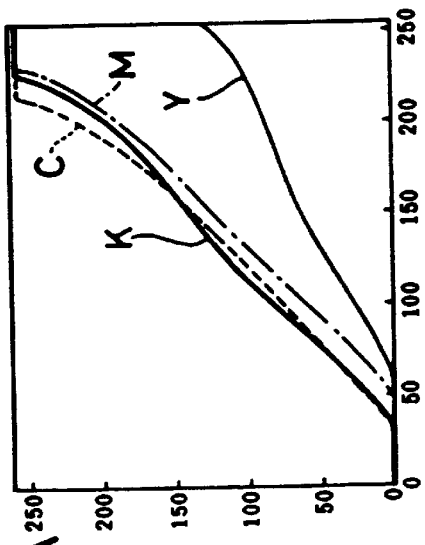
Figure 6D:
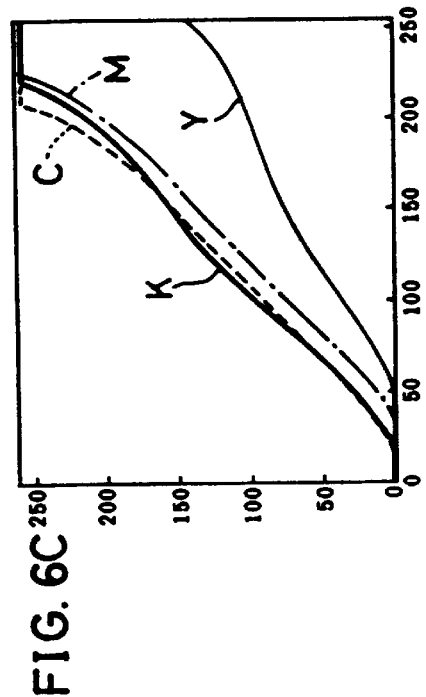
Figure 8A:
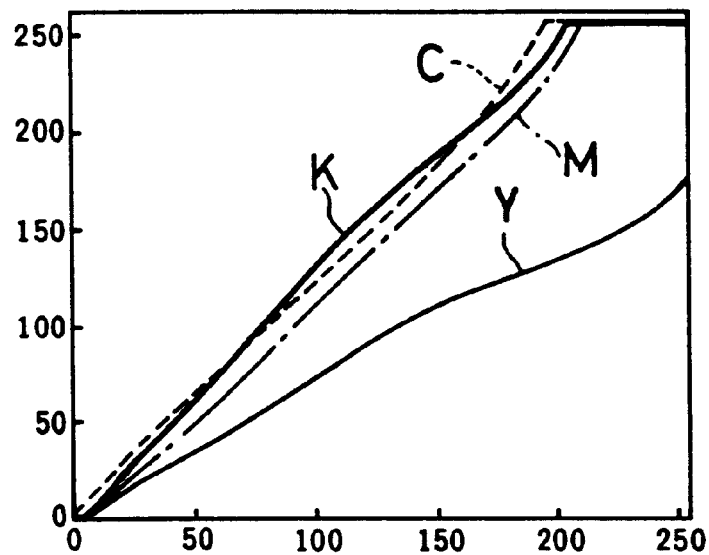
Figure 8B:
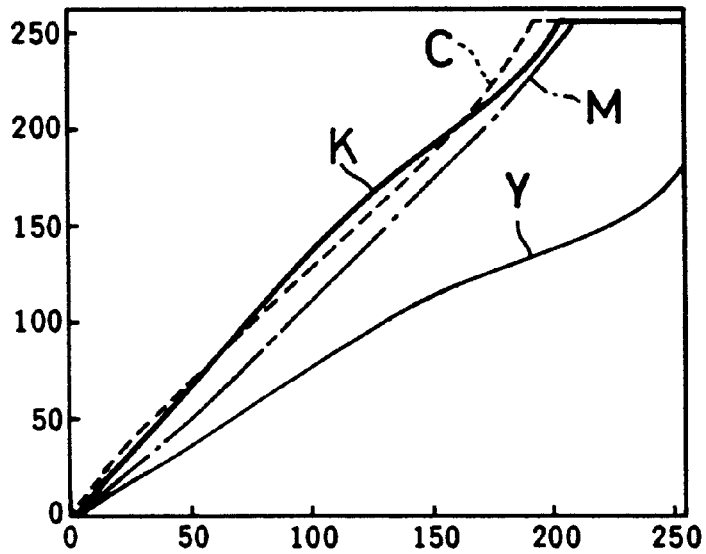

Specifically, the gamma correction data selection means 473 selects the gamma correction curve (set) according to the following formula:

when $\Delta D = -25$, select correction curve in FIG. 6A;
when $\Delta D = -20$, select correction curve in FIG. 6B;
when $\Delta D = -15$, select correction curve in FIG. 6C;
when $\Delta D = -10$, select correction curve in FIG. 6D;
when $\Delta D = -5$, select correction curve in FIG. 7A;
when $\Delta D = +5$, select correction curve in FIG. 7B;
when $\Delta D = +10$, select correction curve in FIG. 7C;
when $\Delta D = +15$, select correction curve in FIG. 7D;
when $\Delta D = +20$, select correction curve in FIG. 8A;
and
when $\Delta D = +25$, select correction curve in FIG. 8B.

It should be appreciated that the gamma correction data selection means 473 may select either one of the gamma correction curves closer to the upper or lower value when the value of $\Delta D$ lies in between the upper value and lower value.

Further, the gamma correction data selection means 473 may be provided with curve interpolation means for interpolating two gamma correction curves. When the difference $\Delta D$ lies in between the upper and lower values, the two gamma correction curves of the upper and lower values are subjected to interpolation to produce a new curve and to set the interpolated curve as the new gamma correction curve.

Figure 9:
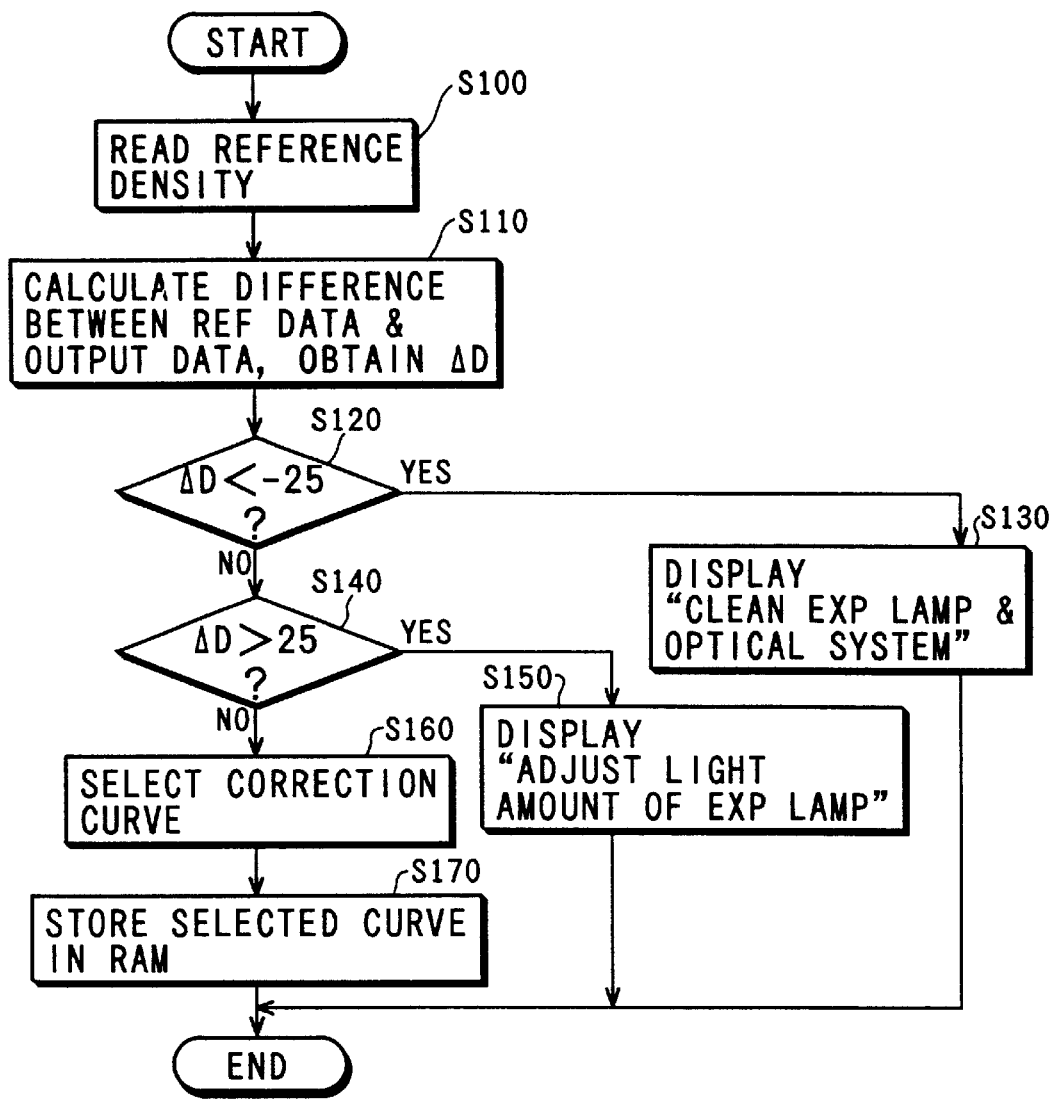
FIG. 9 is a flowchart showing operation procedures of the image reading apparatus when a reference density read key is operated.

Next, referring to FIG. 9, described are control operations of the image reading apparatus of this invention when the reference density read key 11 is operated.

When a reference document, e.g., a photographic document is set on the contact glass of the document scan unit 3 by a service person, and the reference density read key 11 is operated, an image reading operation by the image reading apparatus is initiated. First, the exposure lamp 31 is turned on to emit light, while the shading correction plate 30 and the reference document having the predetermined reference density are scanned to conduct an image reading operation (in Step S100).

Specifically, the CCD line sensor 41 receives light reflected from the reference document and from the shading correction plate 30 and outputs a voltage signal indicative of received intensity of light whose level is in proportion to the received light amount. The outputted voltage signal is amplified, and converted into a digital value. Then, a shading correction is performed, and luminance data on the primary colors, R, G, and B are converted into density data on the reference colors, C, M, and Y by the density conversion means 45.

Subsequently, the judgment means 472 calculates a difference in output level obtained by comparing density data on the respective colors, C, M, and Y which are outputted from the density conversion means 45 with the reference density data which are stored in the ROM 48 in advance for the respective colors C, M, and Y. An average value of the difference in output level for the respective colors C, M, and Y is calculated and set as a difference in output level $\Delta D$ for the colors C, M, and Y (in Step S110).

Next, judged is whether the value of $\Delta D$ is less than $-25$ (in Step S120). If $\Delta D<-25$ (YES in Step S120), the processing control system 4 controls the message display portion 21 to display information that cleaning of the exposure lamp 31 and optical system 33 is necessary (in Step S130). On the other hand, if $\Delta D \geq -25$ (NO in Step S120), then, it goes on to be judged whether $\Delta D > +25$ (in Step S140).

If $\Delta D > +25$ (YES in Step S140), the processing control system 4 controls the message display portion 21 to display information that cleaning of the contact glass of the document scan unit 3 and adjustment of light emission amount of the exposure lamp 31 are necessary (in Step S150).

On the other hand, if $-25 \leq \Delta D \leq +25$ (NO in Step S140), a gamma correction curve set corresponding to the value of $\Delta D$ is selected from the plurality of gamma correction curve sets shown in FIGS. 6A to 8B (in Step S160). Then, the selected gamma correction curve set is stored in the RAM 49 (in Step S170).

In this way, automatic gradation adjustment in an image reading operation of reading an original document image after selection of the gamma correction curve is conducted on the basis of the selected gamma correction curve set stored in the RAM 49 in place of the reference gamma correction curve set in FIG. 3. It is to be noted that when the value of $\Delta D \approx 0$, the reference gamma correction curve set in FIG. 3 is used in performing automatic gradation adjustment.

Thus, the gamma correction curve suitable for forming an image with a desirable density level is selected in accordance with the density data obtained by reading the reference document. Accordingly, even if image reading performance is deteriorated during use of the digital copying machine, the image reading performance can be automatically recovered to the initial favorable level by merely reading the reference document, as long as the difference in output level in the unit of 8 bit data lies in the region from $-25$ to $+25$, i.e., the measurement error lies in the range of $\pm 10\%$.

Accordingly, a service person can remedy the situation of poor image formation and eliminate a cause for deterioration of image reading performance in a short time at the location where the digital copying machine is installed, irrespective of the fact that the cause is due to smearing of the shading correction plate or of the optical system 33 and without a laborious work such as cleaning of the shading correction plate 30 and/or optical system 33 and adjustment of the exposure lamp 31.

As mentioned above, according to this invention, the reference density data for the reference document of the predetermined reference density is stored in advance, while a plurality of gamma correction curve sets, each of which is different from the reference gamma correction curve set, are stored in advance, as well as the reference gamma correction curve set. After light intensity data representative of the intensity of light received from the reference document is subjected to a shading correction, the shading corrected data is converted into density data. One gamma correction curve set is selected from the plurality of gamma correction curve sets in correspondence to the difference between the obtained density data and the stored reference density data. Gradation of density data is automatically adjusted based on the selected gamma correction curve set.

Accordingly, even though the level of light intensity data obtained by the light receiving means is changed, an adverse effect resulting from the change can be offset. Thereby, there can be assuredly prevented deterioration of image quality by an image reading operation of the image reading apparatus, even though there may exist smearing of the optical system and shading correction means (shading correction plate).

Further, the image reading apparatus may be provided with a reference density read key. An operator can assuredly select a suitable gamma correction curve (set) by merely placing the reference document on the contact glass and operating the reference density read key.

Moreover, the image reading apparatus may be provided with a color separator for separating light reflected from the shading correction plate and document into a plurality of colors (in this embodiment, into three primary colors of R, G, and B) to receive light intensity data in terms of the three primary colors. The thus received light intensity data on the primary colors of R, G, and B are converted into density data on the reference colors of C, M, and Y (and K). The above light receiving and conversion steps are conducted for each of the primary colors. Accordingly, even though the level of light intensity data obtained by the light receiving means is varied according to characteristics of color, an adverse effect due to the variation of light intensity data can be eliminated. Thereby, there can be obtained a desirable color image, while preventing deterioration of image quality, even though there may exist a certain extent of smearing on the optical system and shading correction means.

The present invention is not limited to the above embodiment, and is applicable to the following modifications (1) to (5).

(1) In the above embodiment, the CCD line sensor 41 is a color sensor capable of reading the colors of R, G, and B. Alternatively, the line sensor may be a monochromatic sensor, without the provision of color filters having the primary colors of R, G, and B. In this case, medium gradation levels between white and black, i.e., gradation levels corresponding to gray color can be read with more accuracy.

(2) In this embodiment, the CCD line sensor comprises a multitude of CCDs. However, the sensor may comprise a phototransistor, photodiode or other type of photoelectric conversion element.

(3) The judgment means 472 may output a difference in output level on each of the colors, C, M, and Y obtained by comparing the output data and the stored reference density data to the gamma correction data selection means 473 as it is, i.e., without a calculation, and the gamma correction data selection means 473 may individually select the gamma correction curve for each of the colors C, M, Y, and K from the gamma correction curves in FIGS. 6A to 8B based on the output result.

(4) In the above embodiment, the image reading apparatus of this invention is described for use in a digital copying machine. Alternatively, the present invention is applicable to an image scanner without a printer or to a facsimile machine provided with a data communication device in place of the printer.

(5) In the foregoing embodiment, the difference in output level between the reference density data which is stored in advance and output density data obtained by reading the reference document is used to select a suitable gamma correction curve. Alternatively, the ROM 48 may store a look-up table in which levels of density data for the reference document are stored in correspondence to gamma correction curves, and the gamma correction means 47 may select a gamma correction curve which is in direct correspondence to density data obtained by reading the reference document. In this case, also, the effect similar to the one mentioned above is obtainable.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An image reading apparatus comprising:
    an optical system for guiding light reflected from a shading correction plate and from an original document image to a specified position;
    light receiving means including a number of photoelectric conversion elements for receiving the light reflected from the shading correction plate and the light reflected from the original image via the optical system to output light intensity data;
    shading correction means for performing a shading correction to the light intensity data of the original image based on the light intensity data of the shading correction plate to output shading corrected data;
    density conversion means for converting the shading corrected data into density data;
    reference density data storage means for storing reference density data on a reference document having a predetermined reference density therein;
    gamma correction curve storage means for storing a plurality of gamma correction curves therein;
    correction curve selection means for selecting one gamma correction curve from the plurality of gamma correction curves in correspondence to a difference in output level between the reference density data and current density data obtained by performing a shading correction to light intensity data of the reference document based on the light intensity data of the shading correction plate and by converting the shading corrected light intensity data of the reference document into density data; and
    gradation adjusting means for adjusting a gradation of the density data outputted from the density conversion means based on the selected gamma correction curve.

2. An image reading apparatus according to claim 1, further comprising reference gamma correction curve storage means for storing a reference gamma correction curve therein, the correction curve selection means being put in an inoperative state when the difference in output level between the reference density data and the current density data is insignificant, the gradation adjusting means adjusting the gradation of the density data outputted from the density conversion means based on the reference gamma correction curve when the gamma correction curve selection means is in the inoperative state, while adjusting the gradation of the density data outputted from the density conversion means based on the selected gamma correction curve when the gamma correction curve selection means is put in an operative state.

3. An image reading apparatus according to claim 2, further comprising a reference density read key for reading the reference density of the reference document, the correction curve selection means selecting the one gamma correction curve from the plurality of gamma correction curves only when the reference density read key is operated.

4. An image reading apparatus according to claim 1, wherein:
    the light receiving means separates the light reflected from the shading correction plate and the light reflected from the original document image into a plurality of colors to receive light in terms of the colors and to output color data representative of the respective separated colors;
    the shading correction means performs a shading correction to the color data on the respective colors of the original image based on the color data on the respective colors of the shading correction plate,
    the density conversion means converts the shading corrected color data on the respective colors into density data on corresponding reference colors,
    the reference density data storage means stores in advance the reference density data on the respective reference colors of the reference document having the predetermined reference density therein,
    the gamma correction curve storage means stores in advance a plurality of sets of gamma correction curves therein, each set consisting of gamma correction curves for the reference colors,
    the correction curve selection means calculates a difference in output level between the reference density data on the respective reference colors and current density data on the respective reference colors obtained by performing a shading correction to color data on the respective colors of the reference document based on the color data on the respective colors of the shading correction plate and by converting the shading corrected color data on the respective colors of the reference document into density data, and selects one gamma correction curve set from the plurality of gamma correction curve sets in accordance with the calculation result,
    the gradation adjusting means adjusting the gradation of the density data on the respective reference colors outputted from the density conversion means based on the selected gamma correction curve set.

5. An image reading apparatus according to claim 4, wherein the correction curve selection means calculates an average value of the differences between the reference density data on the respective reference colors and the current density data on the respective reference colors and selects the one gamma correction curve set in correspondence to the average value.

6. An image reading apparatus according to claim 4, wherein the correction curve selection means selects the one gamma correction curve based on the difference between the reference density data on the respective reference colors and the current density data on the respective reference colors individually for the reference colors, from the plurality of gamma correction curve sets.

7. An image reading apparatus according to claim 4, wherein the light receiving means includes a color separator for separating the light into the primary colors of red, green, and blue, and the reference colors are cyan, magenta, and yellow corresponding to the red, green, and blue, respectively.

8. An image reading apparatus according to claim 7, further comprising color signal processing means for generating density data on black color based on the density data on the reference colors of cyan, magenta, and yellow to generate corrected density data on the reference colors of cyan, magenta, and yellow using the generated density data of black, the gamma correction curve storage means stores in advance a plurality of gamma correction curve sets for black therein, the correction curve selection means calculates a difference in output level between the reference density data on the respective reference colors and current density data on the respective reference colors obtained by performing a shading correction to the color data on the respective primary colors of the reference document based on the color data on the respective primary colors of the shading correction plate and by converting the shading corrected color data on the respective primary colors of the reference document into density data, and selects one gamma correction curve set from the plurality of gamma correction curve sets in accordance with the calculation result, the gradation adjusting means adjusts the gradation of the corrected density data on the respective reference colors and a gradation of the generated density data on black based on the selected gamma correction curve set.

* * * * *